(12) United States Patent
Hapsari et al.

(10) Patent No.: US 9,491,643 B2
(45) Date of Patent: *Nov. 8, 2016

(54) USER APPARATUS AND METHOD IN MOBILE COMMUNICATION SYSTEM

(75) Inventors: Wuri Andarmawanti Hapsari, Tokyo (JP); Anil Umesh, Tokyo (JP); Mikio Iwamura, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 78 days.

This patent is subject to a terminal disclaimer.

(21) Appl. No.: 13/261,489

(22) PCT Filed: Apr. 27, 2011

(86) PCT No.: PCT/JP2011/060285
§ 371 (c)(1),
(2), (4) Date: Jan. 3, 2013

(87) PCT Pub. No.: WO2011/136279
PCT Pub. Date: Nov. 3, 2011

(65) Prior Publication Data
US 2013/0109322 A1     May 2, 2013

(30) Foreign Application Priority Data

Apr. 30, 2010  (JP) ................................. 2010-105998

(51) Int. Cl.
*H04B 17/00*    (2015.01)
*H04W 24/08*    (2009.01)
(Continued)

(52) U.S. Cl.
CPC ............. *H04W 24/08* (2013.01); *H04W 24/10* (2013.01); *H04W 88/06* (2013.01)

(58) Field of Classification Search
CPC  H04B 17/0042; H04W 24/01; H04W 24/10; H04W 24/08; H04W 24/02; H04W 48/16; H04W 36/0083; H04W 36/30; H04W 84/045; H04W 36/0022; H04W 36/08; H04W 36/0055

USPC ......................................................... 455/67.13
See application file for complete search history.

(56) References Cited

U.S. PATENT DOCUMENTS

2005/0026612 A1 *  2/2005  Moon ................... H04W 76/02
                                                                   455/435.1
2007/0243907 A1 * 10/2007  Jin et al. ....................... 455/566
(Continued)

FOREIGN PATENT DOCUMENTS

| CN | 101242554 A | 8/2008 |
| EP | 2552149 A2 | 1/2013 |

(Continued)

OTHER PUBLICATIONS

Ericsson, "Triggers for logged MDT measurement reporting," 3GPP TSG-RAN WG2 #69; R2-101426; San Francisco, USA; Feb. 22-26, 2010 (3 pages).
(Continued)

*Primary Examiner* — Ajibola Akinyemi
(74) *Attorney, Agent, or Firm* — Osha Liang LLP

(57) ABSTRACT

A user apparatus including at least operation modes of a connection mode and an idle mode, includes: a measurement unit that measures radio quality in the idle mode according to measurement target information (Config#m, Config#n) indicating that the user apparatus is set beforehand to report a measurement value of radio quality to a management node; a storage unit that stores the measurement target information and the measurement value of radio quality measured by the measurement unit; and a transmission unit that transmits, in the connection mode, an indicator indicating that there is the measurement value of radio quality to the management node, and transmits a report signal including the measurement value of radio quality to the management node according to a request from the management node, wherein, when the user apparatus obtains new measurement target information (Config#n), the storage unit stores the new measurement target information according to a predetermined updating rule (reconfiguration model).

9 Claims, 12 Drawing Sheets

(51) Int. Cl.
*H04W 24/10* (2009.01)
*H04W 88/06* (2009.01)

(56) References Cited

U.S. PATENT DOCUMENTS

| | | | | |
|---|---|---|---|---|
| 2007/0287392 | A1* | 12/2007 | Sagne et al. | 455/119 |
| 2009/0168662 | A1* | 7/2009 | Tsuboi et al. | 370/252 |
| 2010/0190449 | A1* | 7/2010 | Suzuki | 455/67.11 |
| 2010/0330921 | A1* | 12/2010 | Kim et al. | 455/67.11 |
| 2011/0098042 | A1* | 4/2011 | Mach et al. | 455/435.1 |
| 2011/0183662 | A1* | 7/2011 | Lee | H04W 24/10 455/422.1 |
| 2011/0194441 | A1* | 8/2011 | Jung | H04W 76/046 370/252 |

FOREIGN PATENT DOCUMENTS

| | | |
|---|---|---|
| WO | 2009/022835 A2 | 2/2009 |
| WO | 2009/096305 A1 | 8/2009 |

OTHER PUBLICATIONS

Orange, et al., "MDT Measurement Model," 3GPP TSG-RAN WG2 Meeting #68bis; R2-100239; Valencia, Spain; Jan. 18-22, 2010 (3 pages).
Huawei, "Consideration on CP Solution of Minimization of Drive Test," 3GPP TSG-RAN WG2 #68; R2-096600; Jeju, Korea; Nov. 9-13, 2009 (4 pages).
3GPP TS 37.320 V0.3.2, "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall Description; Stage 2 (Release 10)," Apr. 2010 (10 pages).
International Search Report issued in PCT/JP2011/060285, mailed Jun. 14, 2011, with translation (9 pages).
Written Opinion issued in PCT/JP2011/060285, mailed Jun. 14, 2011 (4 pages).
Office Action in corresponding Japanese Patent Application No. 2010-105998 dated May 11, 2012, with translation (5 pages).
3GPP TS 37.320 V0.4.0, "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Apr. 2010 (10 pages).
International Preliminary Report on Patentability from PCT/JP2011/060285 mailed on Nov. 6, 2012 (7 pages).
Office Action in corresponding Chinese Patent Application No. 201180031463.9 dated Nov. 25, 2013, with translation (13 pages).
Office Action issued in counterpart Chinese application No. 201180031463.9 mailed Apr. 9, 2014 (13 pages).
Extended European Search Report issued in corresponding European Application No. 11775060.4 dated Dec. 8, 2014 (12 pages).
Office Action issued in corresponding Chinese Application No. 201180031463.9 dated Sep. 25, 2014, and English translation thereof (12 pages).
Office Action in counterpart Chinese Patent Application No. 201180031463.9, dated Jul. 27, 2015 (12 pages).
Office Action in counterpart Chinese Patent Application No. 2011800314619, dated Nov. 26, 2015 (12 pages).

* cited by examiner

FIG.3

|  | REPORT CONDITION 1: SAMPLE EXIST | REPORT CONDITION 2: BUFFER 90% REPORT CONDITION 3: EXPIRATION OF TIMER |
|---|---|---|
| MEASUREMENT VALUE DELETE CONDITION 1: IMMEDIATELY DELETE AFTER REPORTING | MODEL 1 | MODEL 3 |
| MEASUREMENT VALUE DELETE CONDITION 2: DELETE AFTER SUCCESS OF REPORTING | MODEL 2 | MODEL 4 |

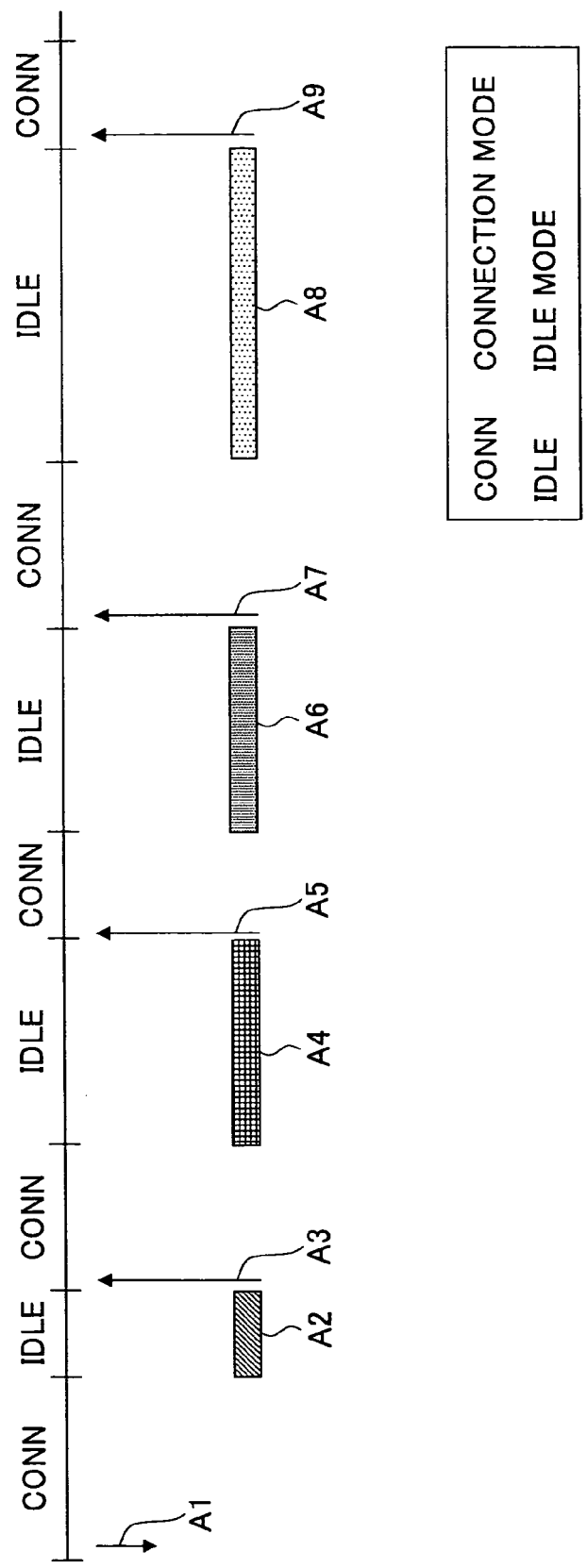

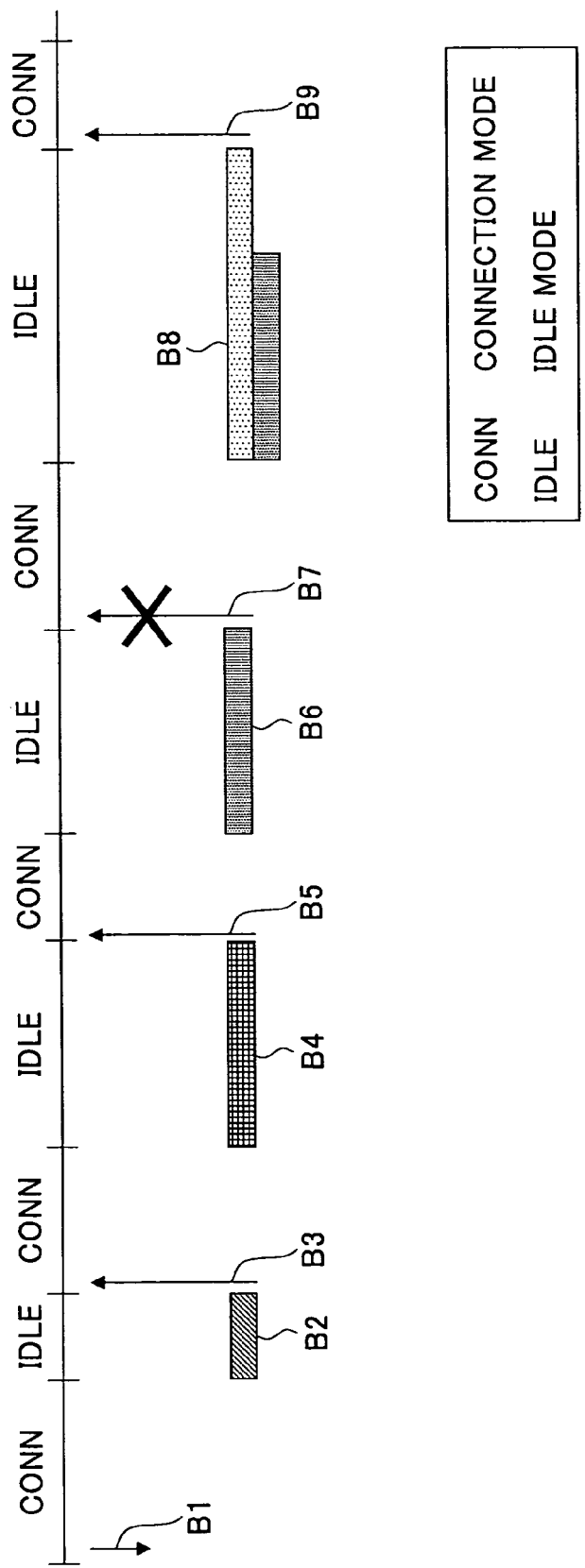

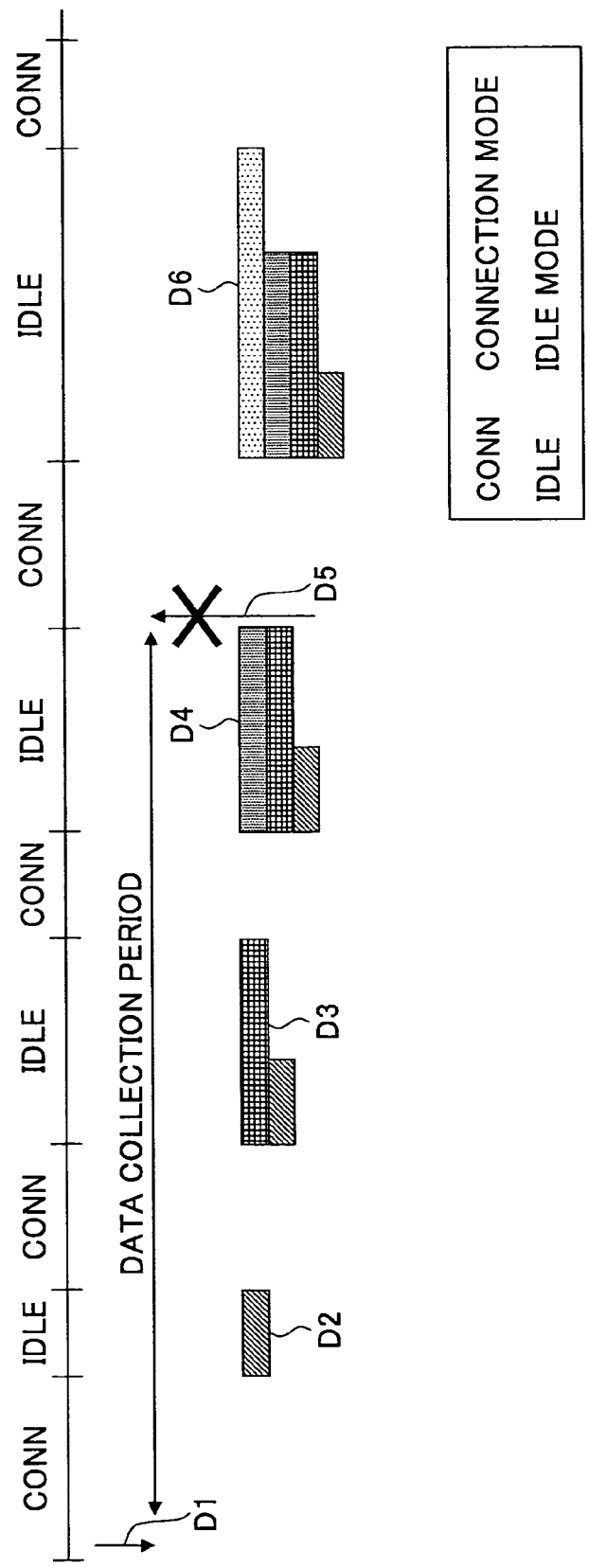

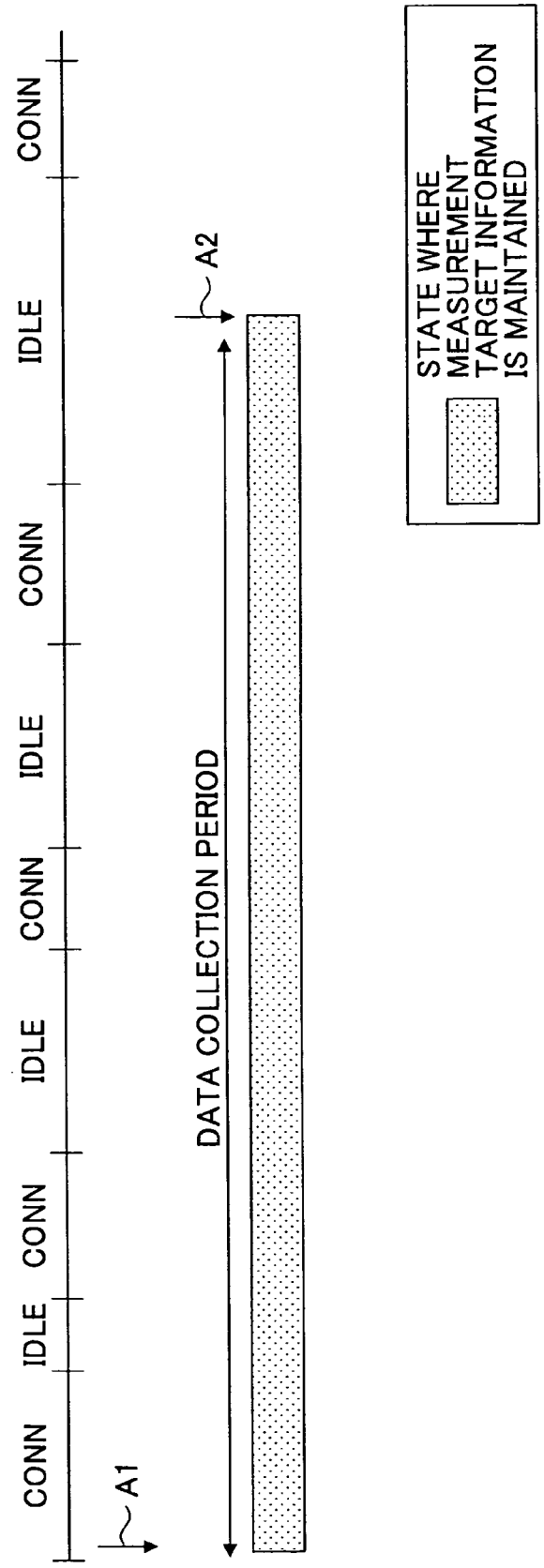

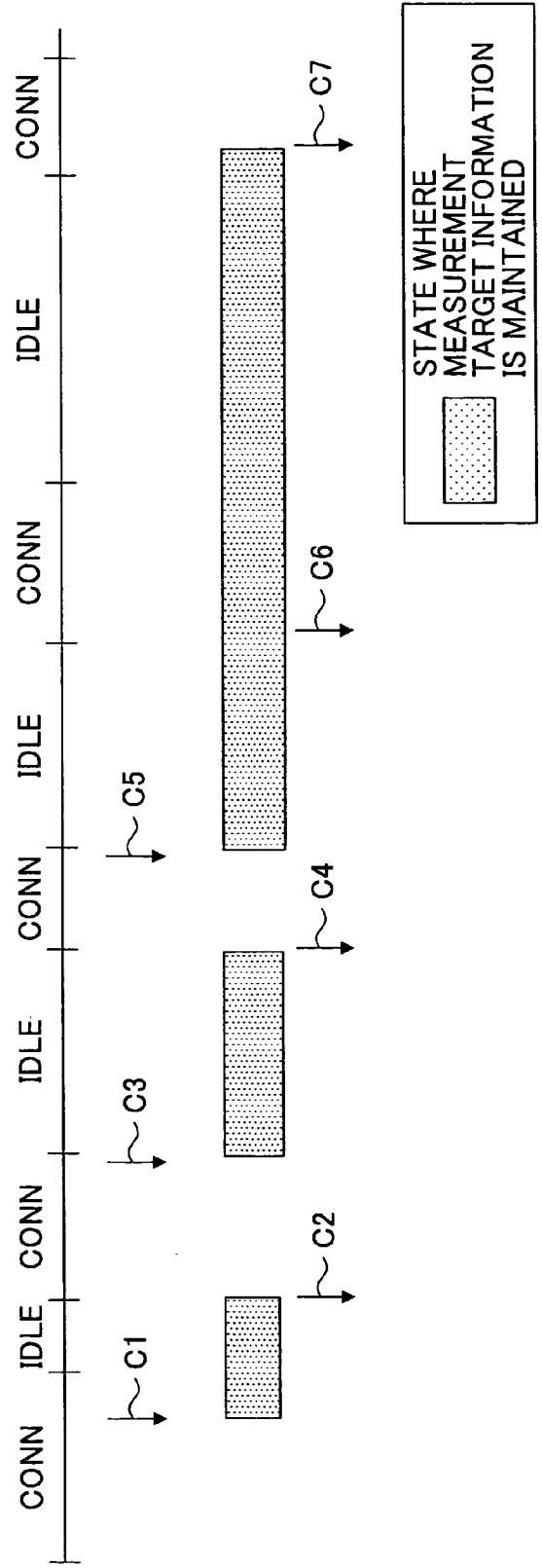

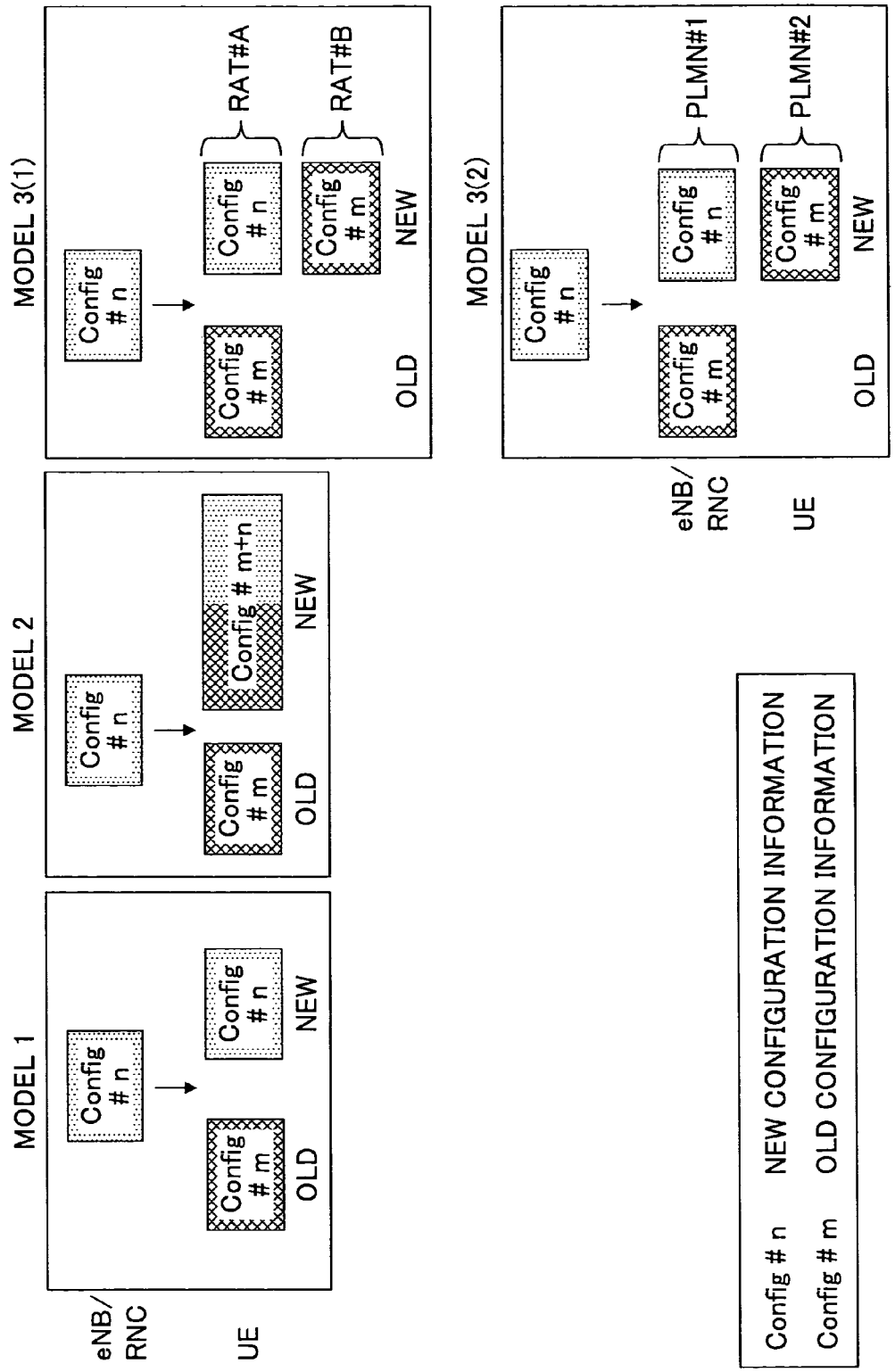

USER APPARATUS AND METHOD IN MOBILE COMMUNICATION SYSTEM

TECHNICAL FIELD

The disclosed invention relates to a user apparatus and a method in a mobile communication system.

BACKGROUND ART

A communication status in a radio network changes depending on a distance from a base station, surrounding environment and time and the like. Therefore, it is necessary that a manager or an operator of a network always ascertains quality status of various areas or cells in the radio network in order to improve quality.

A direct method for measuring the quality status of various areas is that an operator goes to the various areas and performs wave measurement. This method is called Drive Test. However, in the case where the drive test is used for periodically investigating all areas, finding areas that need to be improved, and addressing the improvement, it is feared that the cost becomes very high.

From this viewpoint, a technique is currently being discussed in which a user apparatus in an area, instead of the operator, measures a radio quality and reports a measurement result to the operator. This technique is called MDT (Minimization of Drive Test). For example, the non-patent document 1 describes the MDT.

PRIOR ART DOCUMENTS

[Non-patent document 1] 3GPP TS37.320

SUMMARY OF THE INVENTION

Problem to be Solved by the Invention

However, details for realizing the MDT have not been decided at least at the time of filing of this application.

An object of the disclosed invention is to provide a user apparatus and a method that enables a management node of a radio network to obtain quality information of the radio network easily and efficiently.

Means for Solving the Problem

A user apparatus according to an embodiment of the disclosed invention is a user apparatus including at least operation modes of a connection mode and an idle mode, including:

a measurement unit configured to measure radio quality in the idle mode according to measurement target information indicating that the user apparatus is set beforehand to report a measurement value of radio quality to a management node;

a storage unit configured to store the measurement target information and the measurement value of radio quality measured by the measurement unit; and a transmission unit configured to transmit, in the connection mode, an indicator indicating that there is the measurement value of radio quality to the management node, and to transmit a report signal including the measurement value of radio quality according to a request from the management node, wherein, when the user apparatus obtains new measurement target information, the storage unit stores the new measurement target information according to a predetermined updating rule.

Effect of the Present Invention

According to an embodiment of the disclosed invention, a user apparatus and a method that enables a management node of a radio network to obtain quality information of the radio network easily and efficiently can be provided.

BRIEF DESCRIPTION OF THE DRAWINGS

FIG. 3 is a diagram showing examples of combinations of report conditions and measurement value delete conditions;

FIG. 4A is a diagram showing an operation example in a case where a report condition 1 and a measurement value delete condition 1 are combined (model 1);

FIG. 4B is a diagram showing an operation example in a case where a report condition 1 and a measurement value delete condition 2 are combined (model 2);

FIG. 4D is a diagram showing an operation example in a case where report conditions 2/3 and a measurement value delete condition 2 are combined (model 4);

FIG. 5A is a diagram showing a situation in a case where measurement target information is deleted according to the delete condition 1;

FIG. 5C is a diagram showing a situation in a case where measurement target information is deleted according to the delete condition 3;

FIG. 6 is a diagram showing a method for updating measurement target information.

EMBODIMENTS FOR CARRYING OUT THE INVENTION

Embodiments are described from the following viewpoints.

1. System
2. Reporting condition
3. Measurement value delete condition
4. Operation example for reporting and deleting a measurement value
   4.1 Model 1
   4.2 Model 2
   4.3 Model 3
   4.4 Model 4
5. Delete condition of measurement target information
6. Operation example for deleting measurement target information
7. Update of measurement target information

[Embodiment 1]

<1. System>

Figure 1:
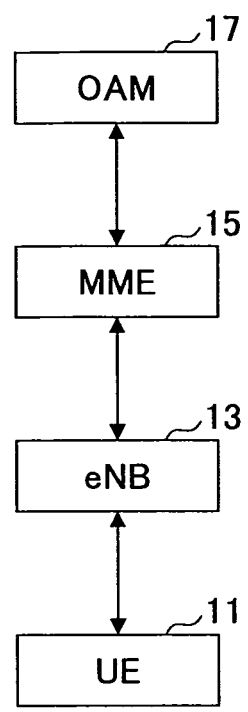
FIG. 1 is a diagram showing an outline of a system used in an embodiment.

FIG. 1 shows an outline of a system used in an embodiment. FIG. 1 shows elements, as an example, related to the present embodiment among various functional elements of a mobile communication system. FIG. 1 shows a user apparatus (UE) 11, a base station apparatus (eNB) 13, an exchange station (MME) 15, and a network management node (OAM) 17. For the sake of convenience, the embodiment is explained using terms in E-UTRAN. But, it is not essential for the present invention. The present invention can be applied to various communication systems. For example, the present invention may be applied to a system of a W-CDMA scheme, a W-CDMA system of a HSDPA/HSUPA scheme, a system of a LTE scheme, a system of an LTE-Advanced scheme, a system of an IMT-Advanced scheme, WiMAX, a system of a Wi-Fi scheme and the like. For example, a radio network controller (RNC) may exist in the upper side of the base station.

Typically, the user apparatus (UE) 11 is a mobile station. But, it may be a fixed station. The user apparatus (UE) 11 may be any proper apparatus that can measure and report radio quality. For example, the user apparatus (UE) 11 is a mobile phone, an information terminal, a personal digital assistant, a mobile personal computer and the like, for example. But, the user apparatus (UE) is not limited to these. The user apparatus (UE) 11 is described later with reference to FIG. 2.

The base station (eNB) 13 performs radio communication with the user apparatus (UE) 11, and performs communication (cable communication, typically) with the exchange station. For example, the base station (eNB) 13 performs scheduling for assigning resources for a radio downlink and a radio uplink. The user apparatus (UE) 11 can perform radio communication by using the resources determined by the scheduling.

The exchange station (MME) 15 exists in an upper side of the base station. For example, the exchange station (MME) 15 performs management of subscriber information, mobility management, sending and receiving control, billing control, QoS control and the like.

The network management node (OAM) 17 collects measurement values of radio quality in various areas in the radio network, and sends an instruction for improving quality of the radio network to the exchange station (MME) 15 and/or the base station (eNB) 13. For example, the network management node (OAM) 17 sends instructions for changing transmission power of waves to be sent to a specific area, and the number of connecting users and the like.

Figure 2:
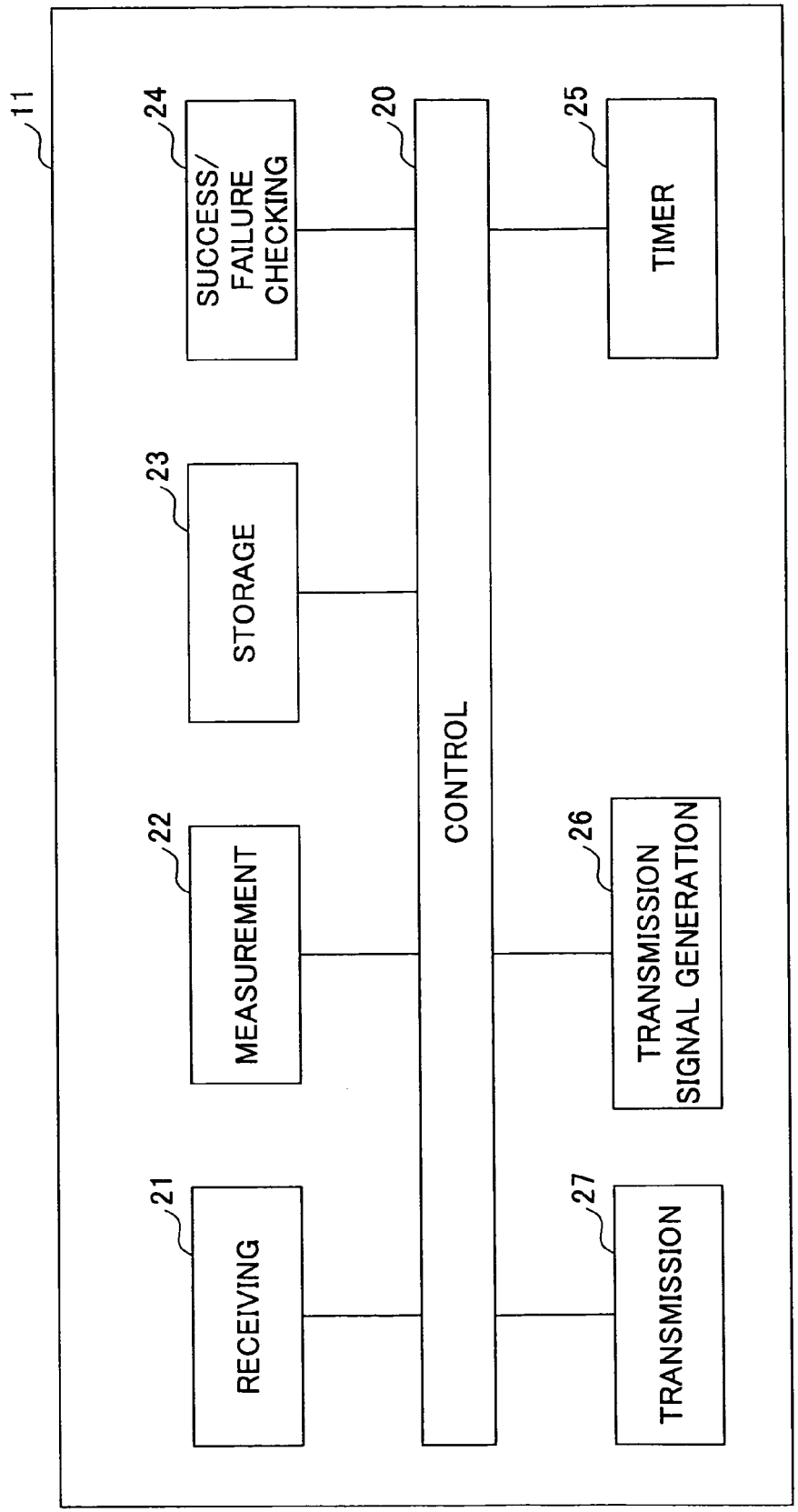
FIG. 2 is a diagram showing a user apparatus (UE)

FIG. 2 shows the user apparatus (UE) 11. FIG. 2 shows elements, as an example, related to the present embodiment among various functional elements of the user apparatus. FIG. 2 shows a control unit 20, a receiving unit 21, a measurement unit 22, a storage unit 23, a success/failure checking unit 24, a timer 25, a transmission signal generation unit 26 and a transmission unit 27.

The control unit 20 controls operation of various functional elements in the user apparatus (UE) 11.

The receiving unit 21 receives a radio signal from the base station (eNB) 13, and demodulates and decodes the signal.

The measurement unit 22 measures radio quality based on the received radio signal. As an example, a measurement value of radio quality can be obtained based on a reception level of a pilot signal in the received signal. The reception level may be represented as received power, electric field strength RSSI, desired wave received power RSCP, path loss, SIR, SINR, S/N, C/N, $Ec/N_0$ and the like, for example.

The storage unit 23 stores various data and information necessary for operation of the user apparatus (UE) 11. For example, the storage unit 23 stores measurement target information as well as a measurement value measured by the measurement unit 22. Measurement target information is reported from the management node (OAM) 17 to the user apparatus (UE) 11 via the base station (eNB) 13. The measurement target information is information indicating that the user apparatus (UE) 11 is set beforehand so as to report the measured value of the radio quality to the management node (OAM) 17. The measurement target information may be called configuration information or policy information in terms of determining a target of measurement. The target of measurement can be determined from various viewpoints. For example, the measurement target information includes information of a place such as an area or a cell where the user apparatus resides, information of contract type of the user (information indicating that the user agrees to report radio quality, for example), ability information of user apparatus (information indicating that the user apparatus is provided with sufficient software and hardware for reporting radio quality, for example), information indicating a vendor providing the user apparatus, event information by which measurement is performed, and the like. For example, the event information indicates that measurement should be performed when a reception level of a signal from a serving cell becomes equal to or less than a predetermined threshold.

The success/failure checking unit 24 determines whether reporting of the radio quality by the user apparatus (UE) 11 succeeds or not. The determination may be performed by using any proper method known in this technical field. For example, the success/failure checking unit 24 may determine success or failure of the report by receiving acknowledgement signal (ACK (positive acknowledgement) or NACK (negative acknowledgement)) for a transmission signal from the user apparatus (UE) 11. Or, after the user apparatus (UE) 11 transmits a signal including a measured value of radio quality, if a positive acknowledgement is not received from the base station after expiration of a given period, it may be associated with failure of transmission. Also, it may be associated with failure of transmission that the user apparatus (UE) 11 does not receive a positive acknowledgement from the base station even after the user apparatus (UE) 11 transmits signals the maximum number of times of retransmission. The case where the user apparatus (UE) 11 cannot receive the positive response (ACK) may include a case where the base station (eNB) is not provided with a function for reporting a signal including the measurement value to the network management node (OAM) (in the case of a base station which does not support MDT).

The timer 25 times expiration of a given period according to a trigger. Various events are considered as the trigger. As the period the timer 25 measures, there are a period for reporting a measurement value of radio quality, a period from a time when storing a measurement value of radio quality to a time when it is deleted, a period in which report of radio quality is requested (period during which the measurement target information is effective), and the like.

The transmission signal generation unit 26 generates a signal to be transmitted to the base station (eNB) 13, the exchange station (MME) 15 and/or the network management node (OAM) 17. Especially, in the present embodiment, the transmission signal generation unit 26 generates a report signal including a measured value of radio quality measured according to report target information.

The transmission unit 27 converts the signal generated by the transmission signal generation unit 26 into a signal for radio transmission so as to perform radio transmission.

As mentioned above, it is necessary that the network management node (OAM) 17 (FIG. 1) ascertains status of areas of the radio network to improve quality of the areas. The network management node (OAM) 17 determines concrete contents of the measurement target information or the policy information, and determines a user apparatus that should report the measurement value of the radio quality. The measurement target information or the policy information is reported to a corresponding user apparatus (UE) 11 via the exchange station (MME) 15 and the base station (eNB) 13. Although the measurement target information, the policy information and the configuration information are synonymous in the above usage of the terms, the policy information and the configuration information may be used distinctly. For example, information obtained by converting policy information transmitted by the network management node (OAM) 17 into a format of the RRC message transmitted from the base station (eNB) 13 to the user apparatus (UE) 11 may be called configuration information.

In any way, when a target event occurs in a target area, the user apparatus (UE) 11 measures the measurement value of the radio quality according to the configuration information. A report signal including the measurement result is transmitted by the uplink, and reported to the network management node (OAM) 17 via the base station (eNB) 13 and the exchange station (MME) 15. Accordingly, the network management node (OAM) 17 collects data of the measurement value of the radio quality to ascertain the status of the area. The network node management (OAM) 17 analyzes the collected data and sends an instruction to the exchange station (MME) and/or the base station (eNB) as necessary. For example, it is instructed to change strength of electric wave to be transmitted to a specific area, the number of call connections in a specific area, and the like.

The user apparatus (UE) 11 transmits, periodically or as necessary, an indicator of downlink quality such as a channel quality indicator (CQI) to the base station (eNB) 13. The CQI is used as a determination criteria for the base station (eNB) to assign radio resources to a user. The measurement value measured and reported by the user apparatus (UE) 11 of the present embodiment is also a physical amount similar to CQI in that the measurement value is an amount representing radio quality. However, in the present embodiment, the measurement value measured and reported by the user apparatus (UE) 11 is reported to the network management node (OAM) 17 that is located at an upper side of the base station (eNB), and is used for the network management node (OAM) 17 to ascertain the status of the area. In this point, the measurement value is largely different from CQI that is used as determination criteria for assigning radio resources to respective users.

<2. Reporting Condition>

There are at least a connection mode and an idle mode as operation modes of the user apparatus. In the case of the connection mode, the user apparatus receives a control signal continuously or every subframe in principle, such that the user apparatus is assigned radio resources and the user apparatus can perform communication of user traffic data. In the case of the idle mode, the user apparatus receives the control signal discontinuously so that battery consumption can be saved.

Measurement of radio quality that is performed according to a request from the network management node (OAM) can be performed either in the connection mode or in the idle mode. For example, it is considered that the user apparatus measures radio quality in the connection mode according to the measurement target information and reports a measurement result by using a message such as an RRC message, for example. Also, it is considered that, the user apparatus measures radio quality and stores a measurement value in the idle mode, then, when the mode is changed to the connection mode, the user apparatus reports the stored measurement value. The present embodiment can be applied to any of the operation modes. But, for the sake of convenience of explanation, the latter case will be considered. That is, the user apparatus measures radio quality according to the measurement target information in the idle mode, and stores the measurement value. Then, when the mode is changed to the connection mode, the user apparatus reports the stored measurement value. When reporting of the measurement value is available, the user apparatus sends an indicator indicating that reporting is available to the base station. The base station (eNB) sends a request signal to the user apparatus to request a measurement value based on the indicator. When the user apparatus receives the request signal, the user apparatus sends a report signal including the measurement value.

There are following conditions, for example, by which the user apparatus sends the indicator indicating that the user apparatus can report a measurement value.

Report condition 1: In a case where there is data of a measurement value. When data of at least one measurement value is stored in the storage unit, the indicator is transmitted. Since it is not necessary that the user apparatus stores many measurement values, this method is desirable in terms of the required memory capacity of the user apparatus.

Report condition 2: In a case where the data amount of the measurement values stored in the storage unit occupies a predetermined ratio of the storage unit. For example, when 90% of a predetermined buffer area is occupied by data of the measurement values, the user apparatus reports that stored measurement values can be reported. Since reporting frequency can be reduced by increasing the data amount reported at one time, this method is preferable in terms of efficient use of network resources (including signaling resources) required for reporting.

Report condition 3: In a case where a given period such as a predetermined data collecting period expires. For example, in this case, the user apparatus performs data collection from the start of measurement of radio quality until a given period expires, and after the given period expires, the user apparatus reports that the measurement value can be reported. This method is preferable since reporting frequency can be decreased so that network resources (including signaling resources) required for reporting can be used efficiently, and the network management node (OAM) can obtain a new measurement value at a constant frequency with reliability.

<3. Measurement Value Delete Condition>

Since there is a limit of information amount that the storage unit of the user apparatus can store, it is desirable to delete stored data of the measurement value. As an example, it is considered to delete the data of the measurement value of the storage unit in the following cases.

Measurement value delete condition 1: In a case where the user apparatus transmits a report signal including a measurement value of radio quality to the base station apparatus (and to the network management node, eventually). That is, in the case when the user apparatus receives a request signal to request the user apparatus to report a measurement value, after transmitting the report signal including the measurement value, the measurement value of the storage unit is immediately deleted. This method is preferable in terms of simplifying operation and the like.

Measurement value delete condition 2: In a case where, after the user apparatus transmits a report signal, the user apparatus confirms that transmission of the report signal succeeds. That is, when transmission of the report signal succeeds, the measurement value is deleted. But, when success of the transmission cannot be confirmed, the measurement value is not deleted and remains stored in the storage unit. This method is preferable from the viewpoint of transmitting the measurement value of radio quality to the base station (eNB) or the network management node (OAM) with reliability. In the case of the measurement value delete condition 1, confirmation of success or failure is not performed, and the measurement value is deleted immediately after the report signal is transmitted. Confirmation of success or failure may be performed by any proper method in this technical field. For example, success of transmission of the report signal may be associated with an event that the base station has returned a positive response (ACK) to the user apparatus. Or, failure of transmission may be associated with an event that the user apparatus does not receive a positive response (ACK) from the base station even though a given period has expired after transmitting the report signal. Also, failure of transmission may be associated with an event that the user apparatus cannot receive a positive response (ACK) from the base station even after transmitting the report signal the maximum number of times of retransmission.

<4. Operation Example of Reporting and Deleting Measurement Value>

For each of the report conditions 1-3, each of the measurement value delete conditions 1-2 may be applied. Also, after-mentioned other conditions may be combined.

FIG. 3 shows examples of combinations of report conditions 1-3 and measurement value delete conditions 1-2. Although, in FIG. 3, the report conditions 2 and 3 are shown together for the sake of simplicity of drawing and explanation, the report conditions 2 and 3 are mutually independent. That is, the measurement value delete condition 1 or 2 can be applied to the report condition 2, and the measurement value delete condition 1 or 2 can be applied to the report condition 3. In FIG. 3, patters of combinations of the report conditions and the measurement value delete conditions are shown as names of "models 1-4" for the sake of convenience.

<4.1 Model 1>

The model 1 is a combination of the report condition 1 and the measurement value delete condition 1. In the case where there is data of a measurement value, when the user apparatus changes to a connection mode, the user apparatus transmits an indicator indicating existence of the measurement value to the base station (eNB) or the network management node (OAM). Also, according to a request from the eNB or the OAM, the user apparatus transmits a report signal including the measurement value, and immediately after transmitting the report signal, the user apparatus deletes the measurement value. This method is preferable from the viewpoint of simplifying operation and the like.

FIG. 4A shows an operation example in the case of the model 1. In general, the lateral axis corresponds to the flow of time, in which the user apparatus operates alternately in the connection mode (CONN) and in the idle mode (IDLE). As shown in the left side of the figure, when the user apparatus operates in the connection mode, the user apparatus receives measurement target information (configuration information) and stores it in the storage unit in step A1. As mentioned above, the measurement target information indicates that this user apparatus needs to report radio quality to the network management node (OAM). As an example, although the measurement target information includes information indicating an area and an event (which indicate that the reception level of the serving cell falls below a threshold), the measurement target information can be determined from various viewpoints.

In step A2, the user apparatus switches to the idle mode, and the user apparatus measures radio quality according to the measurement target information, and stores a measurement result in the storage unit. For example, when the reception level of the serving cell falls below a threshold, the user apparatus can obtain the measurement value by measuring the reception level of a pilot signal from the serving cell. The belt-like parts such as steps A2, A4, A6 and A8 also indicate that the user apparatus stores a measurement value, which is the same in other figures.

In step A3, the user apparatus changes to the connection mode. The user apparatus transmits a report signal including the measurement value stored in the storage unit. In the case of the model 1, after the report signal is transmitted, the measurement value is immediately deleted. After that, in the same way, the user apparatus measures radio quality in the idle mode, stores the measurement value (A4, A6, A8), and reports the measurement value after going to the connection mode, and deletes the measurement value (A5, A7, A9).

<4.2 Model 2>

The model 2 is a combination of the report condition 1 and the measurement value delete condition 2. In the case where there is data of a measurement value, when the user apparatus changes to the connection mode, the user apparatus transmits an indicator indicating existence of the measurement value to the base station (eNB) or the network management node (OAM). Also, according to a request from the eNB or the OAM, the user apparatus transmits a report signal including the measurement value, and the user apparatus deletes the measurement value when the user apparatus confirms that transmission of the report signal succeeds. This method is preferable from the viewpoint that the measurement value can be reported quickly and with reliability, and the like.

FIG. 4B shows an operation example in the case of the model 2. In step B1, the user apparatus receives measurement target information (configuration information) and stores it in the storage unit.

In step B2, the user apparatus changes to the idle mode, and the user apparatus measures radio quality according to the measurement target information, and stores a measurement result in the storage unit.

In step B3, the user apparatus changes to the connection mode. The user apparatus transmits a report signal including the measurement value stored in the storage unit. In the case of the model 2, when the user apparatus confirms that transmission of the report signal succeeds, the user apparatus deletes the measurement value. For the sake of explanation, it is assumed that transmission of the report signal succeeds in step B3.

In step B4, the user apparatus changes to the idle mode, and the user apparatus measures radio quality according to the measurement target information, and stores a measurement result in the storage unit.

In step B5, the user apparatus changes to the connection mode. The user apparatus transmits a report signal including the measurement value stored in the storage unit. For the sake of convenience of explanation, it is assumed that transmission of the report signal succeeds in step B5.

In step B6, the user apparatus changes to the idle mode, and the user apparatus measures radio quality according to the measurement target information, and stores a measurement result in the storage unit.

In step B7, the user apparatus changes to the connection mode. The user apparatus transmits a report signal including the measurement value stored in the storage unit. For the sake of convenience of explanation, it is assumed that transmission of the report signal in step B7 fails. In this case, the transmitted measurement value is not deleted and stored in the storage unit.

In step B8, the user apparatus changes to the idle mode, and the user apparatus measures radio quality according to the measurement target information, and stores a measurement result in the storage unit. Therefore, in the storage unit, there are an old measurement value stored in step B6 and a new measurement value newly stored.

In step B9, the user apparatus changes to the connection mode. The user apparatus transmits a report signal including both of the new and the old measurement values stored in the storage unit. If transmission of the report signal succeeds in step B9, both of the new and the old measurement values stored in the storage unit are deleted. If the transmission fails, as mentioned above, the measurement values are not deleted and continue to be stored.

<4.3 Model 3>

The model 3 is a combination of the report condition 2 or 3 and the measurement value delete condition 1. When the data amount of the measurement value stored in the storage unit occupies a predetermined ratio in the storage unit, or when a predetermined data collection period has expired, the user apparatus transmits an indicator indicating existence of the measurement value to the base station (eNB) or the network management node (OAM). Also, according to a request from the eNB or the OAM, the user apparatus transmits a report signal including the measurement value. The user apparatus deletes the measurement value immediately after transmitting the report signal. This method is preferable from the viewpoint that a sizable amount of measurement values to some extent can be quickly reported.

Figure 4C:
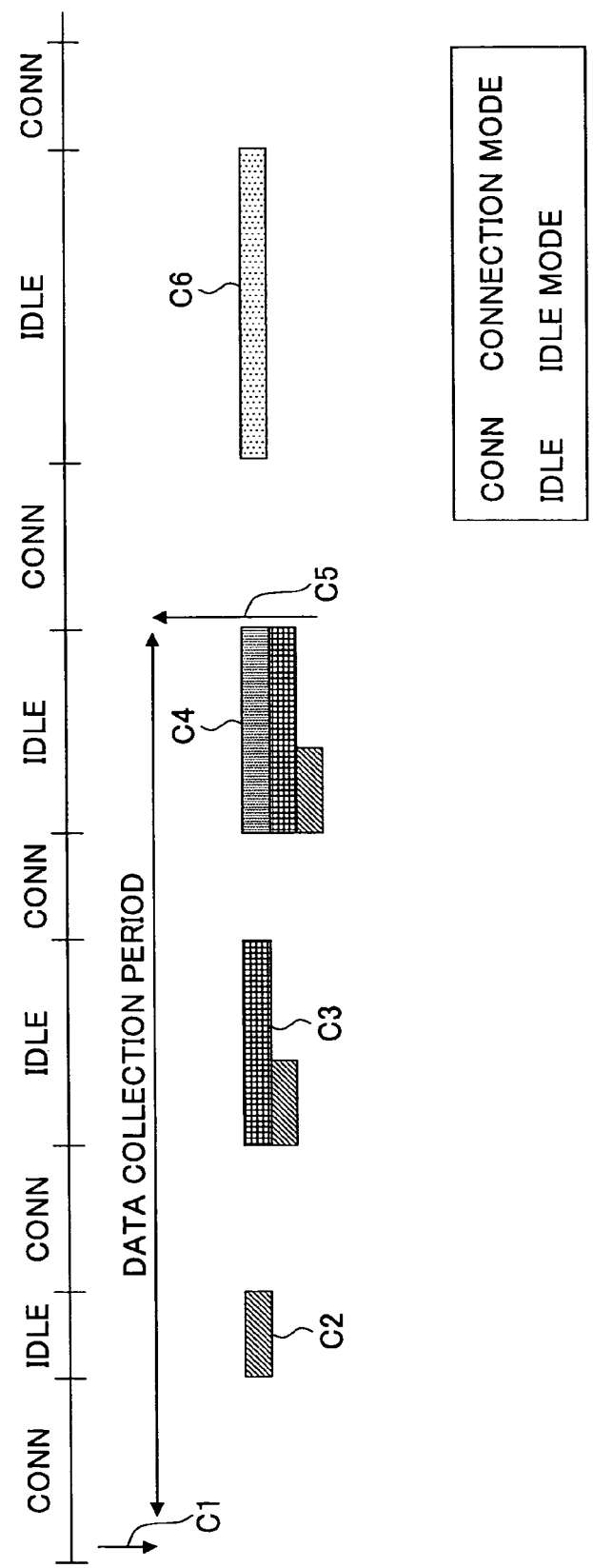
FIG. 4C is a diagram showing an operation example in a case where report conditions 2/3 and a measurement value delete condition 1 are combined (model 3)

FIG. 4C shows an operation example in the case of the model 3. In step C1, the user apparatus receives measurement target information (configuration information) and stores it in the storage unit. After that, the user apparatus starts measuring the given data collection period. For example, a timer is started.

In step C2, the user apparatus changes to the idle mode, and the user apparatus measures radio quality according to the measurement target information, and stores a measurement result in the storage unit. After that, the user apparatus changes to the connection mode. Different from the cases of modes 1 and 2, reporting of the measurement value is not performed because the data collection period has not expired.

In step C3, the user apparatus changes to the idle mode, and the user apparatus measures radio quality according to the measurement target information, and stores a measurement result in the storage unit. In the storage unit, the measurement value stored in step C2 also exists. After that, the user apparatus changes to the connection mode. At this point of time, the data collection period has not expired. Thus, reporting of the measurement value is not performed.

In step C4, the user apparatus changes to the idle mode, and the user apparatus measures radio quality according to the measurement target information, and stores a measurement result in the storage unit. There are also measurement values stored in steps C2 and C3 in the storage unit. In the case of the example shown in the figure, it is assumed that the data collection period has expired at the time when the idle mode completes. In this case, as shown in step C5, when the user apparatus moves to the connection mode, reporting of the measurement value is performed. In the case of the model 3, since the measurement value delete condition 1 is applied, the measurement value is immediately deleted from the storage unit after the measurement value is reported.

In step C6, the user apparatus changes to the idle mode, and the user apparatus measures radio quality according to the measurement target information, and stores a measurement result in the storage unit. Since the measurement value is deleted at the timing of step C5, there is only data that is newly measured in the storage unit.

In the case when the report condition 3 instead of the report condition 2 is applied, similar operation can be realized by replacing "a period until the data collection period has expired" with "a period until the ratio of the storage area occupied by the data of the measurement value reaches a predetermined value (90%, for example)".

<4.4 Model 4>

The model 4 is a combination of the report condition 2 or 3 and the measurement value delete condition 2. When the data amount of the measurement value stored in the storage unit occupies a predetermined ratio in the storage unit, or when a predetermined data collection period has expired, the user apparatus transmits an indicator indicating existence of the measurement value to the base station (eNB) or the network management node (OAM), and the user apparatus transmits a report signal including the measurement value according to a request from the eNB or the OAM. The user apparatus deletes the measurement value when the user apparatus confirms that transmission of the report signal succeeds. This method is preferable from the viewpoint that a sizable amount of measurement values to some extent can be quickly reported.

FIG. 4D shows an operation example in the case of the model 4. In step D1, the user apparatus receives measurement target information (configuration information) and stores it in the storage unit. After that, the user apparatus starts measuring the given data collection period. For example, a timer is started.

In step D2, the user apparatus changes to the idle mode, and the user apparatus measures radio quality according to the measurement target information, and stores a measurement result in the storage unit.

In step D3, the user apparatus changes to the idle mode, and the user apparatus measures radio quality according to the measurement target information, and stores a measurement result in the storage unit. In the storage unit, the measurement value stored in step D2 also exists.

In step D4, the user apparatus changes to the idle mode, and the user apparatus measures radio quality according to the measurement target information, and stores a measurement result in the storage unit. There are also measurement values stored in steps D2 and D3 in the storage unit. In the case of the example shown in the figure, it is assumed that the data collection period has expired at the time when the idle mode completes. Also in this case, as shown in step D5, when the user apparatus changes to the connection mode, reporting of the measurement value is performed. For the sake of convenience of explanation, it is assumed that transmission of the report signal in step D5 fails. In this case, the transmitted measurement value is not deleted and is held in the storage unit.

In step D6, the user apparatus changes to the idle mode, and the user apparatus measures radio quality according to the measurement target information, and stores a measurement result in the storage unit. The measurement value is not deleted at the timing of step D5, so that all of measurement values remain stored in the storage unit. Although not shown in the figure, the measurement values are stored in the storage unit until transmission of the report signal succeeds.

In the case when the report condition 3 instead of the report condition 2 is applied, similar operation can be realized by replacing "the period until the data collection period has expired" with "a period until the ratio of the storage area occupied by the data of the measurement value reaches a predetermined value (90%, for example)".

<5. Delete Condition of Measurement Target Information>

The measurement target information (configuration information or policy information) in the case where radio quality is measured in the idle mode may be applied to any number of idle modes. For example, in the case of the examples shown in FIGS. 4A-4D, the same measurement target information is applied in the four periods of idle mode. However, this is not essential. A period in which a piece of measurement target information is effective can be specified in various viewpoints. For example, the measurement target information may be deleted in the following cases. When the measurement target information is deleted, obligation for the user apparatus to report radio quality is released.

Delete condition 1: A case where a given period such as a predetermined data collection period has expired. For example, after the given period expires from the time when the measurement target information is received, the measurement target information is deleted. This method is preferable from the viewpoint that obligation for the user apparatus to report radio quality is limited to the given period so that it becomes possible not to put an excessive burden upon the user apparatus.

Delete condition 2: A case in which the use apparatus receives a notification, from an upper apparatus such as the base station (eNB) or the network management node (OAM) and the like, indicating that reporting of radio quality is unnecessary. This method is preferable from the viewpoint that, for example, unnecessary measurement and reporting by the user apparatus can be stopped immediately after data collection by the upper apparatus completes.

Delete condition 3: A case where the user apparatus confirms that transmission of the report signal succeeds after the report signal including the measurement is transmitted. That is, in the case when transmission of the report signal fails, the measurement target information is not deleted, and obligation of reporting radio quality is not released, so that the measurement value increases each time when the user apparatus enters the idle mode. Information of users that are likely to fail in transmitting of the report signal is especially important for analyzing area status. Thus, the delete condition 3 is preferable from the viewpoint that measurement values from such users can be obtained with reliability.

<6. Operation Example for Deleting Measurement Target Information>

FIG. 5A shows a situation in a case where measurement target information is deleted according to the delete condition 1. In step A1, the measurement target information is reported to the user apparatus, and is stored in the storage unit. After that, during a given period that is indicated as the data collection period, the measurement target information is kept. Therefore, during that period, each time when the user apparatus goes into the idle mode, radio quality is measured and stored. The measurement value is reported in a connection mode.

In step A2, the data collection period expires, so that the measurement target information is deleted. According to this deletion, obligation for reporting radio quality by user apparatus is released.

Figure 5B:
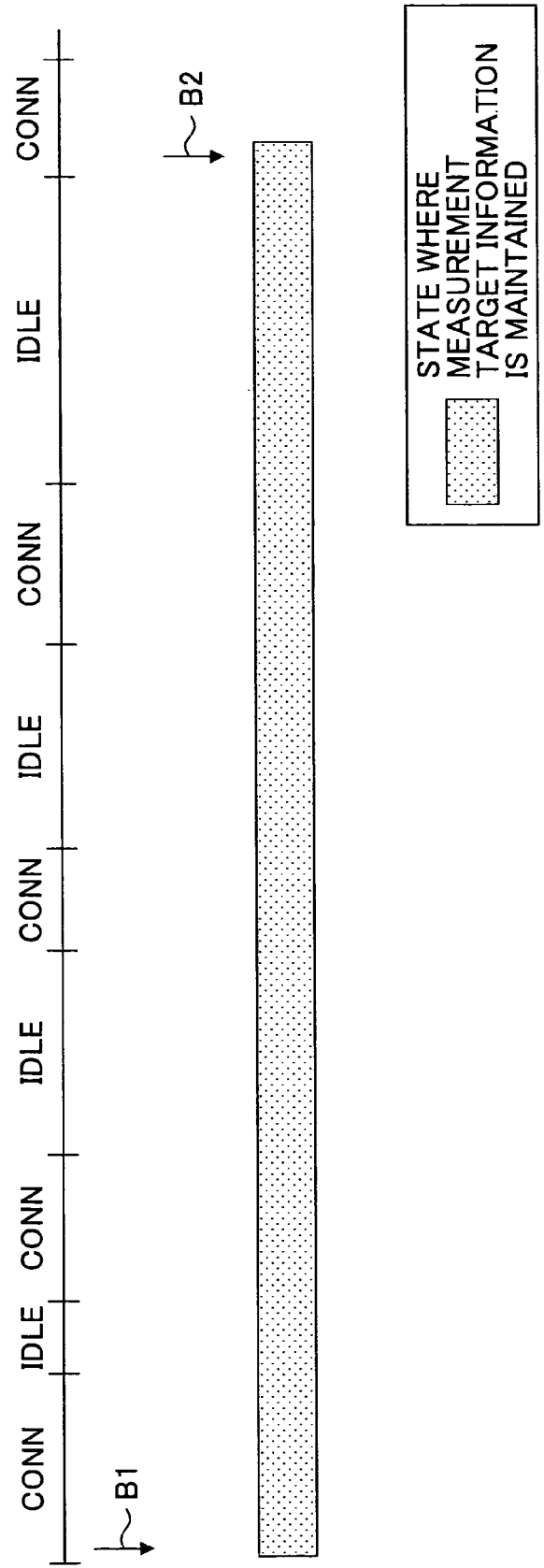
FIG. 5B is a diagram showing a situation in a case where measurement target information is deleted according to the delete condition 2.

FIG. 5B shows a situation in a case where measurement target information is deleted according to the delete condition 2. In step B1, the measurement target information is reported to the user apparatus, and is stored in the storage unit. After that, each time when the user apparatus goes into the idle mode, radio quality is measured and stored. The measurement value is reported in a connection mode.

In step B2, the user apparatus receives a notification indicating that reporting of radio quality is unnecessary, so that the measurement target information is deleted. According to this, obligation for reporting radio quality by the user apparatus is released.

FIG. 5C shows a situation in a case where measurement target information is deleted according to the delete condition 3. In step C1, the measurement target information is reported to the user apparatus, and is stored in the storage unit. When the user apparatus goes into the idle mode, radio quality is measured and stored, and the measurement value is reported in the next connection mode. For the sake of convenience of explanation, it is assumed that the user apparatus confirms that reporting of the measurement value succeeds. In this case, in step C2, the measurement target information is deleted from the storage unit.

In step C3, the measurement target information is reported to the user apparatus, and is stored in the storage unit. When the user apparatus goes into the idle mode, radio quality is measured and stored, and the measurement value is reported in the next connection mode. For the sake of convenience of explanation, it is assumed that the user apparatus confirms that reporting of the measurement value succeeds. In this case, in step C4, the measurement target information is deleted from the storage unit.

In step C5, the measurement target information is reported to the user apparatus, and is stored in the storage unit. When the user apparatus goes into the idle mode, radio quality is measured and stored, and the measurement value is reported in the next connection mode. For the sake of convenience of explanation, it is assumed that reporting of the measurement value fails. In this case, the measurement target information is not deleted and kept stored (step C6). As a result, obligation for reporting radio quality is not released. When the user apparatus goes into the idle mode, measurement and storing of the radio quality are still performed, and the measurement value is reported in the next connection mode. For the sake of convenience of explanation, it is assumed that the user apparatus confirms that reporting of the measurement value succeeds. In this case, the measurement target information is deleted from the storage unit in step C7. According to this, obligation of the user apparatus for reporting radio quality is released.

<7. Update of Measurement Target Information>

In the case of the example as described with reference to FIG. 5C, measurement target information is deleted at a proper timing, and after that, new measurement target information is reported to the user apparatus. However, a case can be considered in which the user apparatus receives new measurement target information when the user apparatus already has some sort of measurement target information. This case corresponds to a case where the user apparatus enters a new area, for example. When the user apparatus receives new measurement target information, it is necessary to follow the new measurement target information in some way.

FIG. 6 shows concrete examples of methods for updating measurement target information. Updating method 1 (model 1): The user apparatus replaces measurement target information (Config#m) stored in the storage unit with new measurement target information (Config#n). The old measurement target information (Config#m) is deleted. This method is preferable from the viewpoint that the user apparatus can easily realize this. Further, this method is advantageous in that the radio access apparatus (base station (eNB)/radio network controller (RNC)), the exchange apparatus (MME) and the network management node (OAM) do not need to distinguish measurement target information that the received measurement value follows.

Updating method 2 (model 2): The user apparatus combines measurement target information (Config#m) stored in the storage unit with new measurement target information (Config#n) so as to generate a piece of new measurement target information (Config#m+n). The combining may be performed based on a difference between the old measurement target information (Config#m) and the new measurement target information (Config#n), and the new measurement target information (Config#n). Comparing and combining of the new and the old pieces of measurement target information is performed by the user apparatus in this case. For example, it is assumed that the old measurement target information (Config#m) defines "to measure radio quality when reception level from the serving cell falls below a threshold in area 1", and that the new measurement target information (Config#n) defines "to measure radio quality when reception level from the serving cell falls below a threshold in area 2". In this case, combined measurement target information (Config#m+n) becomes "to measure radio quality when reception level from the serving cell falls below a threshold in area 1 or area 2".

Updating method 3 (model 3): The user apparatus holds measurement target information (Config#m) stored in the storage unit and new measurement target information (Config#n) separately. The user apparatus select measurement target information according to radio access techniques (RAT) and networks (PLMN). For example, when the user apparatus resides in a system of a radio access technique (RAT#A), the user apparatus performs measurement of radio quality according to the new measurement target information (Config#n). Also, when the user apparatus resides in a system of a different radio access technique (RAT#B), the user apparatus performs measurement of radio quality according to the old measurement target information (Config#m). Or, when the user apparatus resides in a system of a network (PLMN#1), the user apparatus performs measurement of radio quality according to the new measurement target information (Config#n). Also, when the user apparatus resides in a system of a different network (PLMN#2), the user apparatus performs measurement of radio quality according to the old measurement target information (Config#m). Since the user apparatus can recognize entering a system of a different radio access technique (RAT), such selection of measurement target information can be performed. However, it is necessary to introduce an identifier for identifying these pieces of measurement target information and measurement values.

Figure 7:
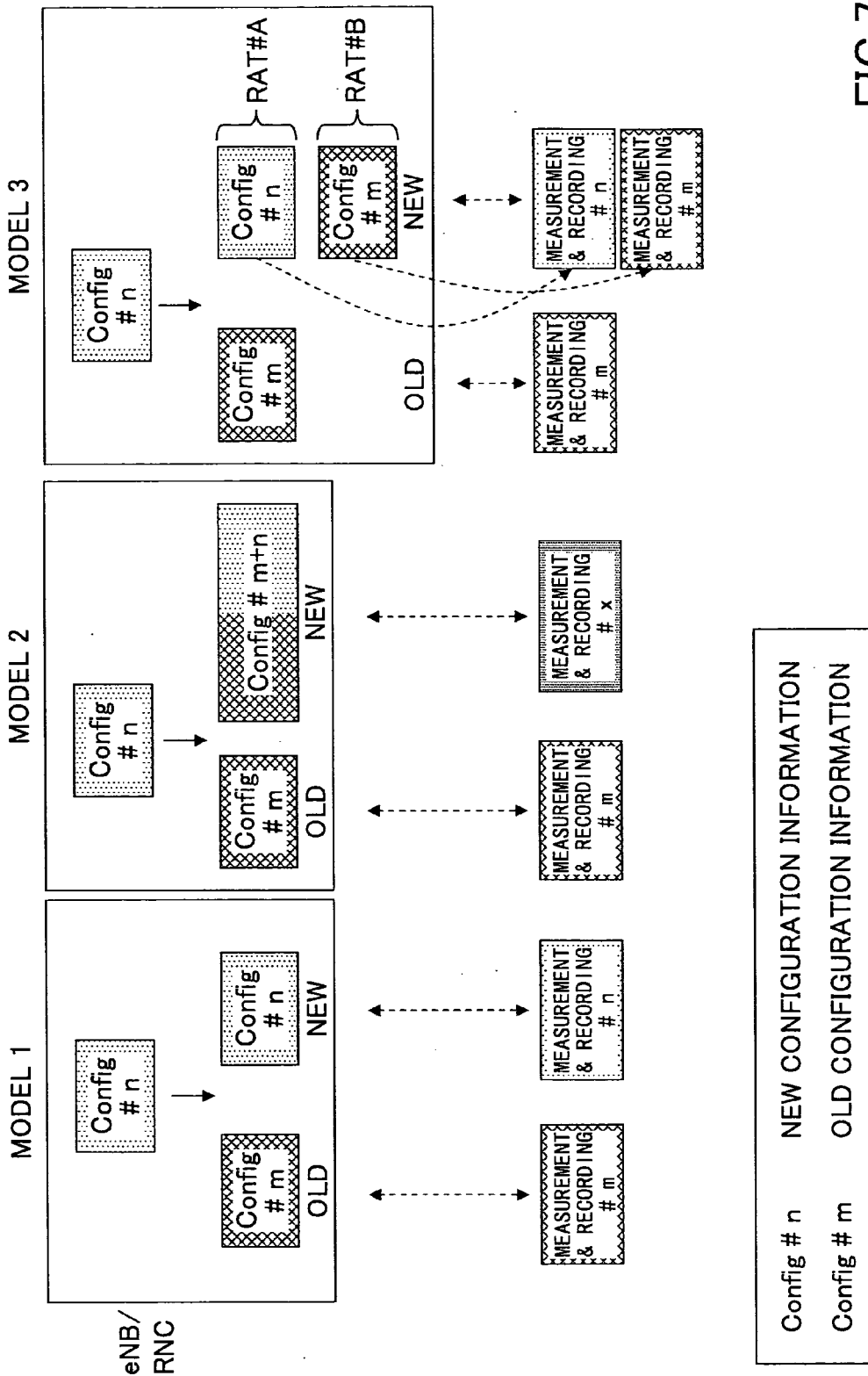
FIG. 7 is a diagram showing a situation before and after updating of measurement target information.

FIG. 7 shows a situation before and after updating of measurement target information. In the case of the model 1, measurement and storing of radio quality are performed based on the old measurement target information (Config#m) before updating. After updating, measurement and storing of radio quality are performed based on the new measurement target information (Config#n). Storing based on Config#m, and measurement and storing based on Config#n are independent with each other, so that measurement and storing are performed separately.

In the case of the model 2, measurement and storing of radio quality are performed based on the old measurement target information (Config#m) before updating. After updating, measurement and storing of radio quality are performed based on the measurement target information (Config#m+n) in which the new and the old pieces of measurement target information are combined. Storing based on Config#m, and measurement and storing based on Config#n are independent with each other, so that measurement and storing are performed separately.

In the case of the model 3, measurement and storing of radio quality is performed based on the old measurement target information (Config#m) before updating. After updating, the user apparatus performs measurement of radio quality according to the new measurement target information (Config#n) when the user apparatus resides in a system of a radio access technique (RAT#A). When the user apparatus resides in a system of another radio access technique (RAT#B), the user apparatus performs measurement of radio quality according to the old measurement target information (Config#m). Storing based on Config#m, and measurement and storing based on Config#n are independent with each other, so that measurement and storing are performed separately.

In the above, the present invention has been explained while referring to the specific embodiments. However, these are merely exemplary. Those skilled in the art will conceive of various modified examples, corrected examples, alternative examples, substituted examples, and the like. For example, the present invention may be applied to any suitable mobile communication system for performing MDT. For example, the present invention may be applied to systems of W-CDMA scheme, W-CDMA systems of the HSDPA/HSUPA scheme, systems of the LTE scheme, systems of the LTE-Advanced scheme, systems of the IMT-Advanced scheme, WiMAX, Wi-Fi scheme systems and the like. While specific numerical value examples are used to facilitate understanding of the present invention, such numerical values are merely examples. Thus, any appropriate value may be used unless specified otherwise.

Classification into each embodiment or item in the description is not essential in the present invention, and features described in two or more items may be combined and used as necessary. Subject matter described in an item may be applied to subject matter described in another item (provided that they do not contradict). Especially, as for the conditions or the updating methods described in the items of "2. Report condition", "3. Measurement value delete condition", "5. Delete condition of measurement target information", and "7. Updating of measurement target information", each of them may be used independently or more than one of them may be combined and used.

For convenience of explanation, the apparatus according to the embodiment of the present invention has been explained by using a functional block diagram. However, the apparatus may be implemented in hardware, software, or a combination thereof. The software may be stored in any proper storage medium such as a RAM (Random Access Memory), a flash memory, a ROM (Read Only Memory), an EPROM (Erasable Programmable ROM), an EEPROM (Electronically Erasable and Programmable ROM), a register, a hard disk (HDD), a removable disk, a CD-ROM, database, server and the like. The present invention is not limited to the above-mentioned embodiment and is intended to include various variations, modifications, alterations, substitutions and so on without departing from the spirit of the present invention.

The present international application claims priority based on Japanese patent application No. 2010-105998, filed in the JPO on Apr. 30, 2010, and the entire contents of the Japanese patent application No. 2010-105998 are incorporated herein by reference.

DESCRIPTION OF REFERENCE SIGNS 11 user apparatus (UE)
13 base station apparatus (eNB)
15 exchange station (MME)
17 network management node (OAM)
20 control unit
21 receiving unit
22 measurement unit
23 storage unit
24 success/failure checking unit
25 timer
26 transmission signal generation unit
27 transmission unit

The invention claimed is:

1. A user apparatus including at least operation modes of a connection mode and an idle mode, comprising:
   a measurement unit configured to measure radio quality in the idle mode according to configuration information indicating that the user apparatus is set beforehand to report a measurement value of radio quality to a management node;
   a storage unit configured to store the configuration information and the measurement value of radio quality measured by the measurement unit; and
   a transmission unit configured to transmit, when a mode of the user apparatus is changed from the idle mode to the connection mode, an indicator indicating that there is the measurement value of radio quality to a base station, and to transmit a report signal including the measurement value of radio quality according to a request from the base station,
   wherein, when the user apparatus obtains new configuration information, the storage unit stores the new configuration information according to a predetermined updating rule,
   wherein, when a predetermined period expires, the storage unit deletes the configuration information, and
   wherein, when the user apparatus receives the new configuration information after the user apparatus enters a new area, the user apparatus replaces the configuration information stored in the storage unit with the new configuration information.

2. The user apparatus as claimed in claim 1, wherein the updating rule indicates replacing configuration information stored in the storage unit with the new configuration information.

3. The user apparatus as claimed in claim 2, wherein the configuration information includes an area, an event and information indicating a type of a user apparatus which are targets for measuring radio quality.

4. The user apparatus as claimed in claim 1, wherein the updating rule indicates generating a piece of configuration information by combining configuration information stored in the storage unit with the new configuration information.

5. The user apparatus as claimed in claim 4, wherein the configuration information includes an area, an event and information indicating a type of a user apparatus which are targets for measuring radio quality.

6. The user apparatus as claimed in claim 1, wherein the updating rule indicates storing first configuration information stored in the storage unit and second configuration information which is new into the storage unit,
   wherein, when the user apparatus resides in a first system, the user apparatus measures radio quality according to the first configuration information, and when the user apparatus resides in a second system, the user apparatus measures radio quality according to the second configuration information.

7. The user apparatus as claimed in claim 6, wherein the configuration information includes an area, an event and information indicating a type of a user apparatus which are targets for measuring radio quality.

8. The user apparatus as claimed in claim 1, wherein the configuration information includes an area, an event and information indicating a type of a user apparatus which are targets for measuring radio quality.

9. A method used in a user apparatus including at least operation modes of a connection mode and an idle mode, comprising the steps of:
   measuring radio quality in the idle mode according to configuration information indicating that the user apparatus is set beforehand to report a measurement value of radio quality to a management node;
   storing the configuration information and the measurement value of radio quality measured in the measuring step into a storage unit; and
   transmitting, when a mode of the user apparatus is changed from the idle mode to the connection mode, an indicator indicating that there is the measurement value of radio quality to a base station, and transmitting a report signal including the measurement value of radio quality according to a request from the base station,
   wherein, when the user apparatus obtains new configuration information, the storage unit stores the new configuration information according to a predetermined updating rule,
   wherein, when a predetermined period expires, the storage unit deletes the configuration information, and
   wherein, when the user apparatus receives the new configuration information after the user apparatus enters a new area, the user apparatus replaces the configuration information stored in the storage unit with the new configuration information.

* * * * *